United States Patent [19]

Stoppani et al.

[11] Patent Number: 4,953,692
[45] Date of Patent: Sep. 4, 1990

[54] DRIVE FRAME FOR A SCRAPER CHAIN CONVEYOR

[75] Inventors: Brian R. Stoppani, Doncaster; Norman Cummings, Barnsley, both of England

[73] Assignee: Gullick Dobson Limited, Wakefield, England

[21] Appl. No.: 284,102

[22] Filed: Dec. 14, 1988

[30] Foreign Application Priority Data

Dec. 18, 1987 [GB] United Kingdom ............. 8729508
Apr. 21, 1988 [GB] United Kingdom ............. 8809423

[51] Int. Cl.$^5$ ............................................. B65G 23/06
[52] U.S. Cl. ................................. 198/834; 198/837; 198/841
[58] Field of Search .............. 198/834, 841, 497, 837

[56] References Cited

U.S. PATENT DOCUMENTS 4,093,065  6/1978  Temme .................... 198/834 X
4,445,878  5/1984  Linke et al. ............... 198/497 X
4,580,676  4/1986  Michelbrink et al. ......... 198/497

FOREIGN PATENT DOCUMENTS 2156943  2/1985  United Kingdom .

Primary Examiner—David A. Bucci
Assistant Examiner—Cheryl L. Gastineau
Attorney, Agent, or Firm—Trexler, Bushnell, Giangiorgi & Blackstone, Ltd.

[57] ABSTRACT

A drive frame (1) for a scraper chain conveyor comprises a pair of spaced-apart parallel sidewalls (2), interconnected by a cross-member (3) welded to both sidewalls (2); a sprocket barrel assembly (18) provided with at least one sprocket ring (19) adapted to engage at least one endless chain assembly of the conveyor; mutually engageable seating surfaces (23, 5) provided respectively on the sprocket barrel assembly (18) and on the cross-member (3); at least one abutment face (7) provided on the cross-member (3); at least one abutment face (26) provided on the sprocket barrel assembly (18) in close but spaced proximity from the cross-member abutment face (7) to define at least one upwardly open pocket (27); and a releasable fastener (28) for securing the sprocket barrel assembly (18) to the drive frame (1) via the seating surfaces (5, 23) that is lowerable into, and raisable from, the pocket (27), and that is also actuable and accessible from above.

28 Claims, 11 Drawing Sheets

DRIVE FRAME FOR A SCRAPER CHAIN CONVEYOR

This invention relates to a drive frame for a scraper chain conveyor.

Such conveyors are used extensively in the transportation of particulate bulk materials such as coal, stone, iron ore, sand, gravel etc., and may be of substantial length, e.g. 200 m, having a so-called head end incorporating a drive sprocket barrel assembly and a so-called tail end incorporating a return sprocket barrel assembly which may be either free running or driven, dependent upon a number of factors such as the conveyor length, its carrying capacity, the power available at the drive sprocket barrel etc.

In detail, a drive frame comprises a pair of parallel sidewalls, spaced apart by an interconnecting deck plate approximating to the width of the conveyor and serving to separate an upper, conveying run (of the chains and attached flight bars), from a lower return run. A proposal for providing inboard bearings for the sprocket barrel assembly, particularly for a heavy duty drive frame, is described in GB No. 2156943. Whilst this last mentioned system provides fundamental advantages, as will be well understood by persons skilled in the art, manufacturing costs are still significant for various reasons. Thus, as with all heavy duty drive frames, it is necessary to provide a detachable deck plate to provide access to the necessary chain strippers etc., for replacement of worn or damaged chain strippers and also to provide access to the fastening nuts of the two horizontally disposed securing studs for the sprocket barrel assembly. Detachable deck plates require a plurality of drilled/tapped holes for various purposes and it is not always readily possible to provide satisfactory hole alignment for drive frames of different manufacturers. Furthermore, detachable deck plates are frequently prone to damage as a compromise must be reached between a deck plate of adequate strength and one that can be man-handled in a mine environment.

According to a first aspect of the present invention, there is provided a drive frame for a scraper chain conveyor comprising:
(i) a pair of spaced-apart parallel sidewalls, interconnected by a cross-member welded to both sidewalls;
(ii) a sprocket barrel assembly provided with at least one sprocket ring adapted to engage at least one endless chain assembly of the conveyor;
(iii) mutually engageable seating surfaces provided respectively on the sprocket barrel assembly and on the cross-member;
(iv) at least one abutment face provided on the cross-member;
(v) at least one abutment face provided on the sprocket barrel assembly in close but spaced proximity from the cross-member abutment face to define at least one upwardly open pocket; and
(vi) a releasable fastening means for securing the sprocket barrel assembly to the drive frame via the seating surfaces, that is lowerable into, and raisable from, the pocket, and that is also actuable and accessible from above whereby, after the lowering of the fastening means from above, actuation of the fastening means from above in a first direction, causes the seating surface(s) of the sprocket barrel assembly to be urged into tight seating engagement with the seating surface(s) of the cross-member and hence with the drive frame, and upon actuation of the fastening means again from above, in an opposite direction, causes the sprocket barrel assembly to be released from tight seating engagement with the cross-member and hence with the drive frame, whereupon the fastening means can be lifted from the pocket(s) to provide for access and/or disassembly and/or servicing.

In one embodiment, the arrangement is such that, after release and removal of the fastening means, the sprocket barrel assembly is rotatable about a transverse axis of the sprocket barrel assembly for access and/or disassembly and/or servicing of components of the drive frame. In another embodiment, after release and removal of the fastening means, the sprocket barrel assembly is retractable from the end of the drive frame in a linear direction for access and/or disassembly and/or servicing of components of the drive frame.

Conveniently, the drive frame seating surfaces are arcuate, with the seating surface(s) of the sprocket barrel assembly arcuately convex with the seating surface(s) of the cross-member being arcuately concave. The seating surface(s) of the sprocket barrel assembly may be provided by an outer peripheral portion(s) of a cylndrical outer casing of the sprocket barrel assembly. It is also preferred for the sprocket barrel assembly to be provided with internal bearings located inboard of the sidewalls. The sprocket barrel assembly would also normally comprise a shaft rotatably supported by the bearings for rotation about an axis extending transversely between the walls, with the shaft provided with the chain-engaging sprocket ring(s). The drive frame is preferably provided with a chain stripper for the or each sprocket ring, which stripper is revealed for ready replacement (due to inevitable wear or damage) upon either upward rotation or retraction of the sprocket barrel assembly.

Preferably, the cross-member is provided with two abutment faces, one located to each opposite side of a longitudinal centre line of the drive frame, with the sprocket barrel assembly provided with two corresponding abutment faces, with a fastening means insertable between each adjacent pair of abutment faces.

The or each fastening means forms an expansion means. In detail, the or each expansion means may take the form of a cartridge comprising two associated wedge members and a displacement screw. The latter preferably terminates at its upper end in a hexagonal nut for engagement by a suitable spanner or socket. Preferably the nut, or more accurately its upper end is contiguous with the upper surface of a deck plate with which the drive frame is conventionally provided, so as not to obstruct the flow of mineral, or the passage of the chain(s) or attached to flight bars through the drive frame yet advantageously provides for access and actuation from above. A single centrally located expansion means may be provided, or two spaced apart expansion means may be provided.

With a twin outboard scraper chain conveyor, two chain strippers would be provided, one at each lateral side, and preferably the strippers are retained in a "boltless" manner. To achieve this the strippers and cross-member may be provided with mutually engageable male/female abutments, with a trapping means. In one embodiment the cross-member may be provided at each lateral side with a recess to receive a lower portion of a chain stripper, with an upper portion of the chain stripper adapted to be engaged by a trapping means e.g., in the form of an integral tongue, of the sprocket barrel assembly, whereby the chain stripper is captivated in position without the use of screws, bolts etc., when the sprocket barrel assembly is in an operating position. The cross-member preferably has a rebate whereby tongues of the sprocket barrel assembly may seat in the rebate to form, with the upper deck plate, a contiguous surface. It follows, that upon rotation of the sprocket barrel assembly the trapping tongues are lifted from the rebate to reveal the chain strippers, whereupon a worn or damaged chain stripper may be lifted out of the drive frame and a replacement chain stripper inserted. This however provides a "handed" arrangement, and if a non-handed sprocket barrel assembly is required, then in accordance with another embodiment, the sprocket barrel assembly (for a twin outboard scraper-chain conveyor) is provided at each lateral side with an extension having a female recess to receive a male projection of an adjacent chain stripper, with the recess being closed by a portion of the cross-member, and hence the chain strippers trapped, when the sprocket barrel assembly has been rotated to its operating position. Preferably, these recesses are laterally open, so that the chain-strippers are insertable and retractable in a lateral direction.

Because the means to retain and release the sprocket barrel assembly within the drive frame is in accordance with the invention, actuable and hence accessible from above, the invention provides the further advantageous possibility, particularly for a heavy duty drive frame, of enabling the deck plate to be of a non-detachable kind, weld permanently in position, and consequently as no manhandling need be considered, the deck plate can likewise be of a heavy duty kind to match the projected service life of the drive frame. In detail, the deck plate may comprise two plates spaced-apart vertically, comprising an upper plate to define a portion of the conveying run and a lower plate to define a portion of the return run, and conveniently, the ends of the upper and lower plates adjacent the sprocket barrel assembly are both welded to the cross-member.

Preferably, the outer casing of the sprocket barrel assembly, its seating surface(s), its abutment surface(s), and any trapping portions, are formed integrally as a casting. The cross-member may likewise be a casting or may be fabricated.

The invention will now be described in greater detail by way of example with reference to the accompanying drawings, in which.

In all embodiments like components are accorded like reference numerals, and all three embodiments exemplified are for use with a scraper chain conveyor of the twin-outboard chain type.

Figure 1:
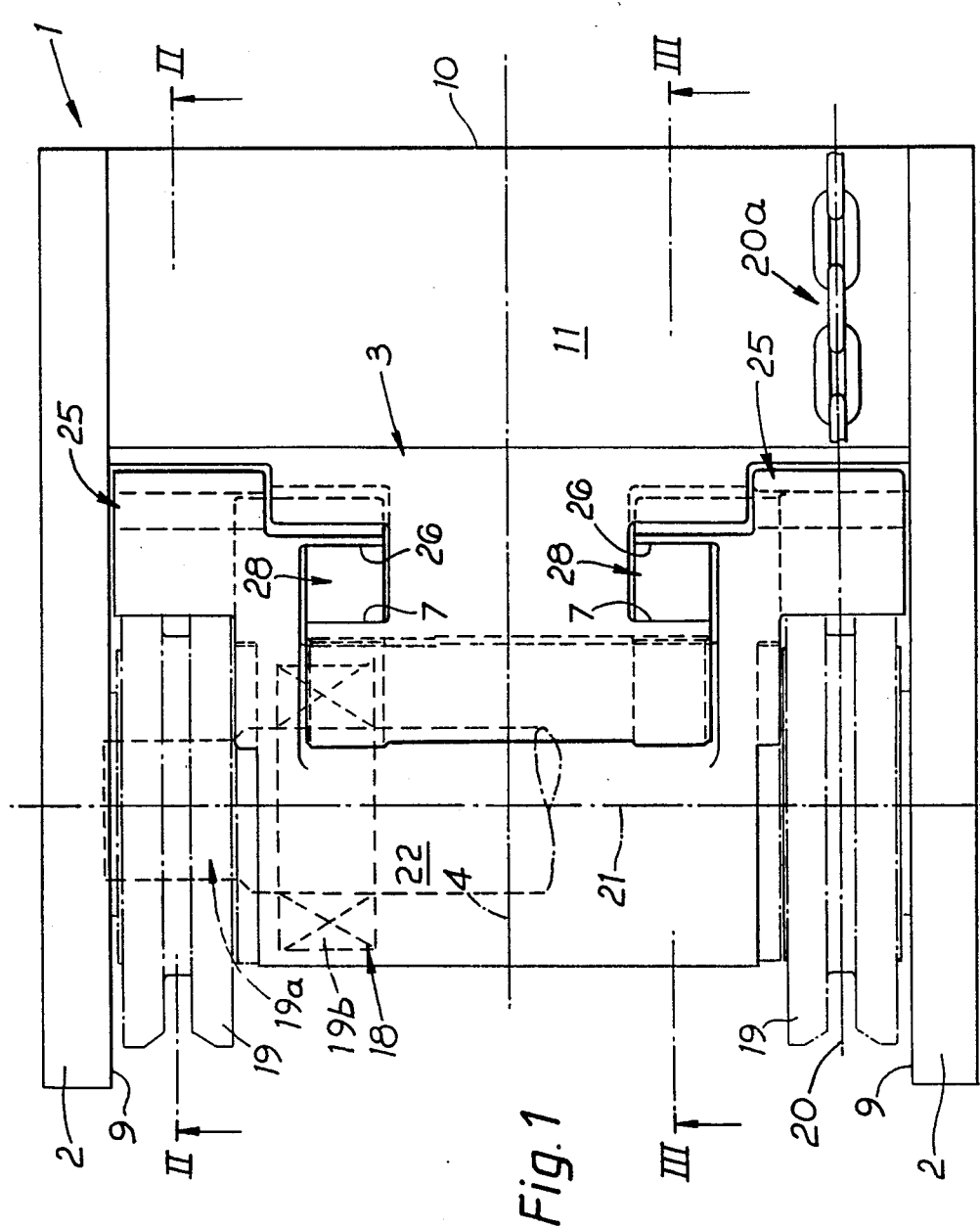
FIG. 1 is a diagrammatic plan view of a first embodiment of drive frame in accordance with the invention.
Figure 2:
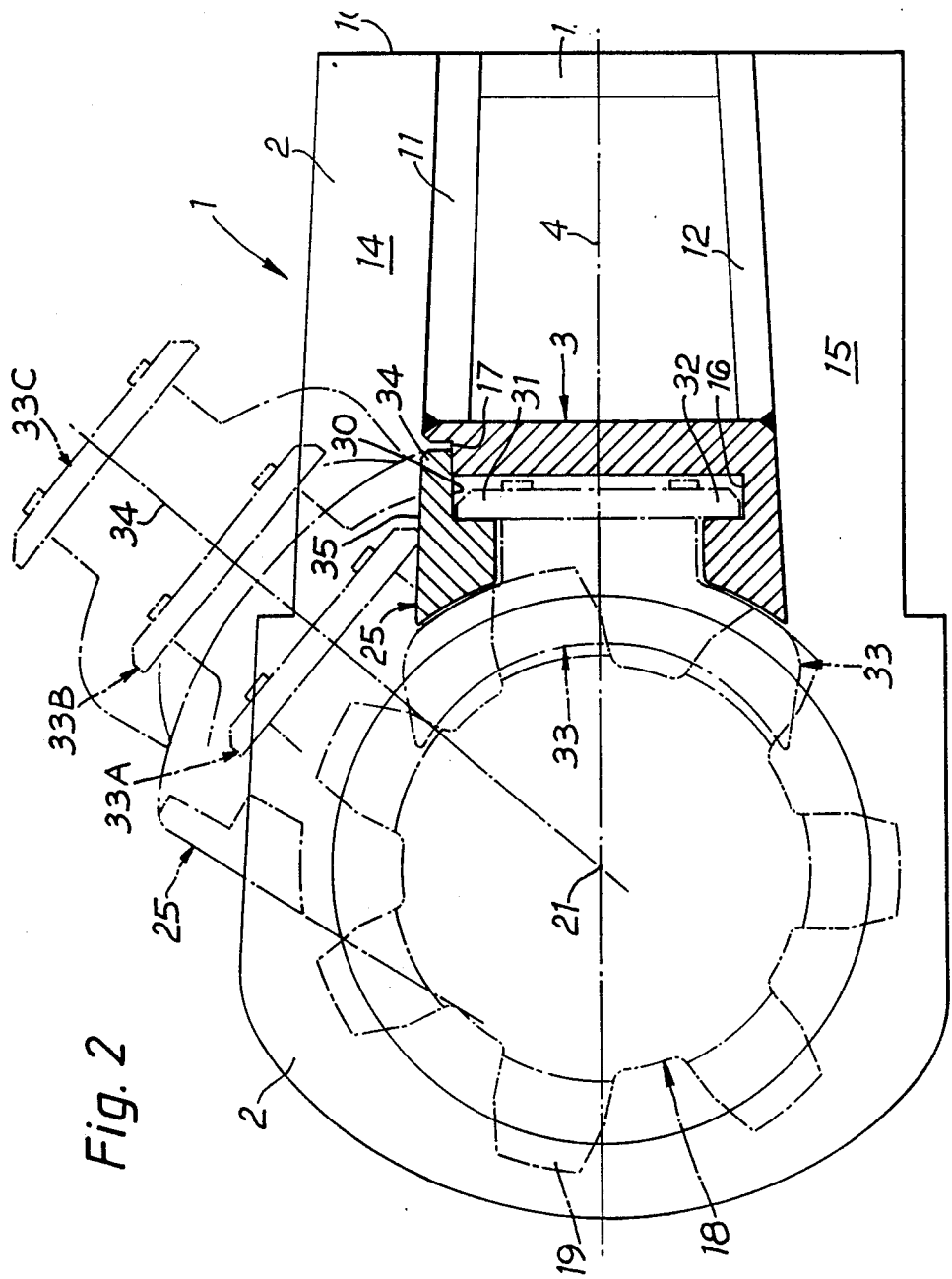
FIG. 2 is a section on the line II—II of FIG. .1.
Figure 3:
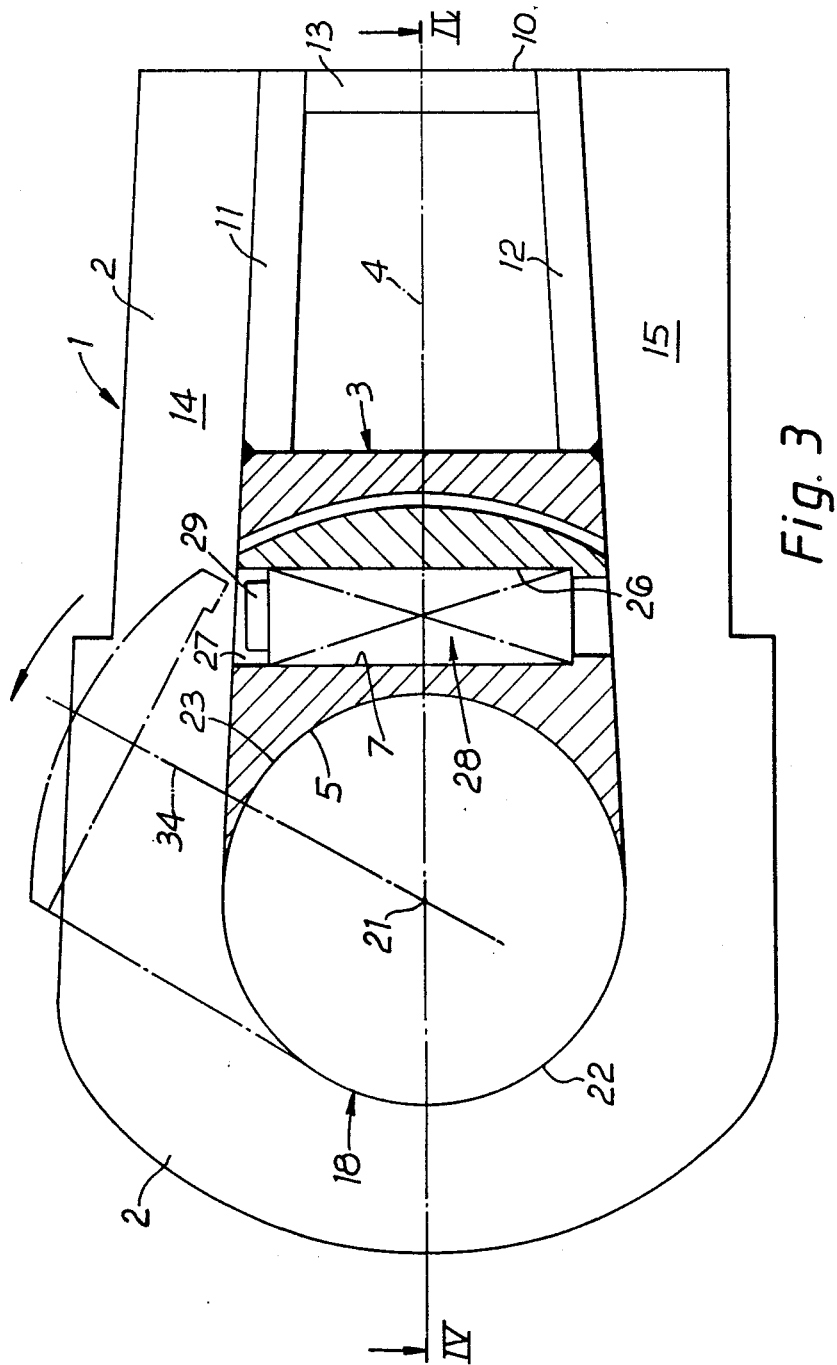
FIG. 3 is a section on the line III—III of FIG. 1.
Figure 4:
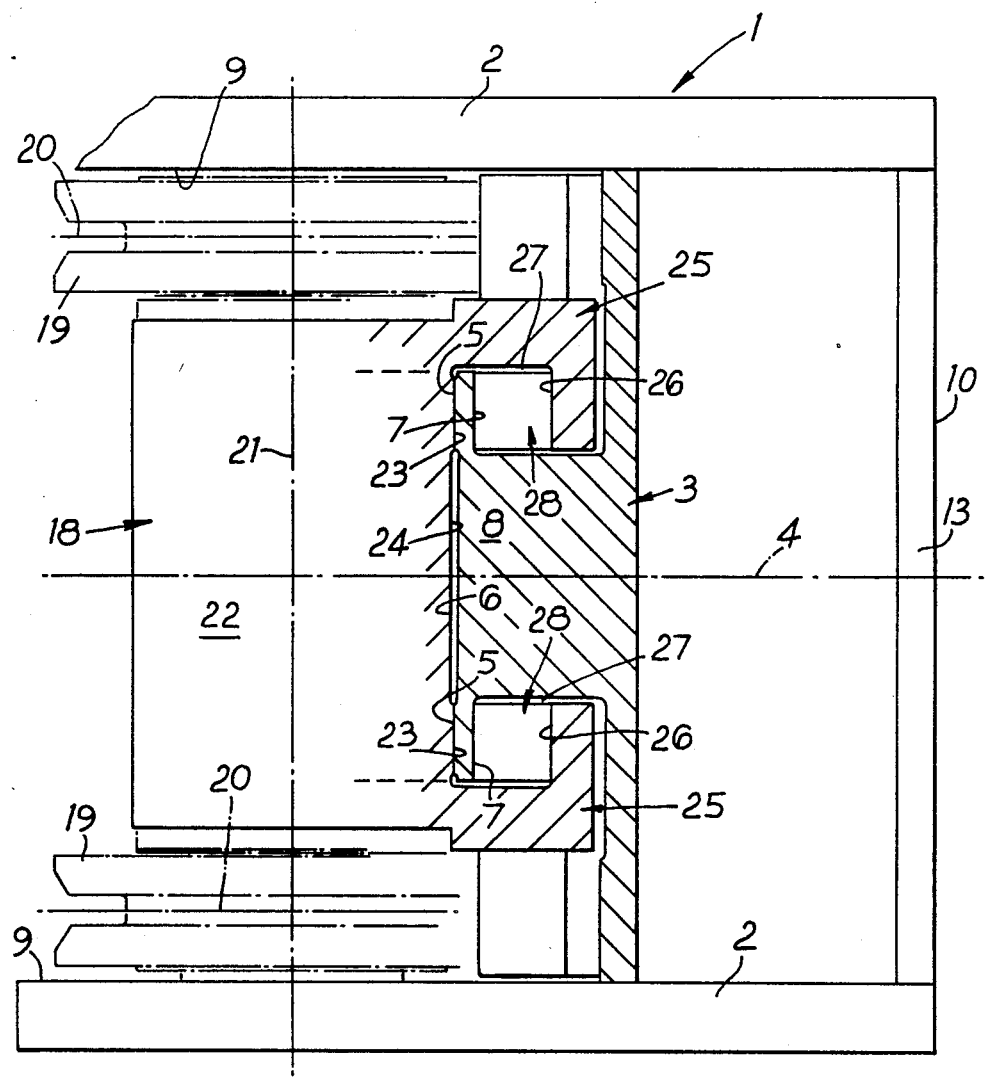
FIG. 4 is a section on the line IV—IV of FIG. 1.
Figure 5:
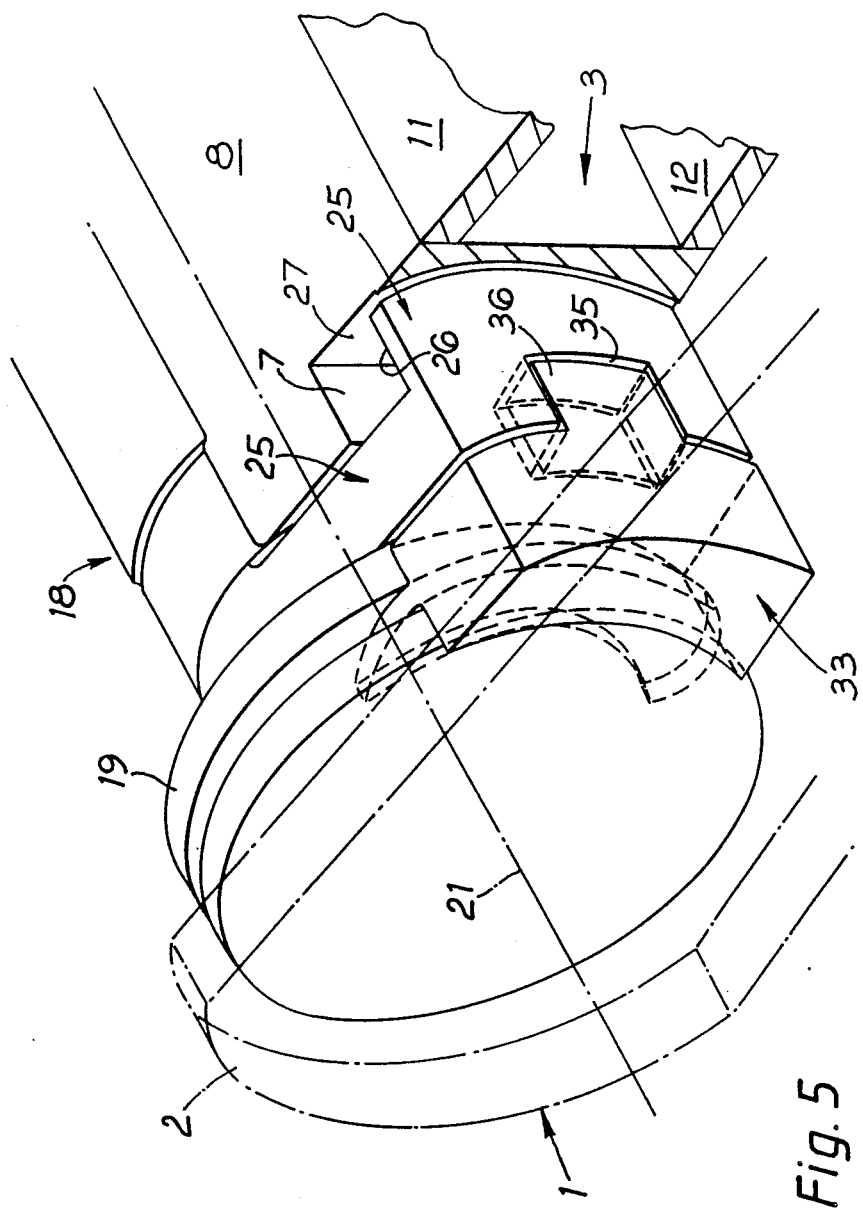
FIG. 5 is a perspective view of a second embodiment of drive frame in accordance with the invention.
Figure 6:
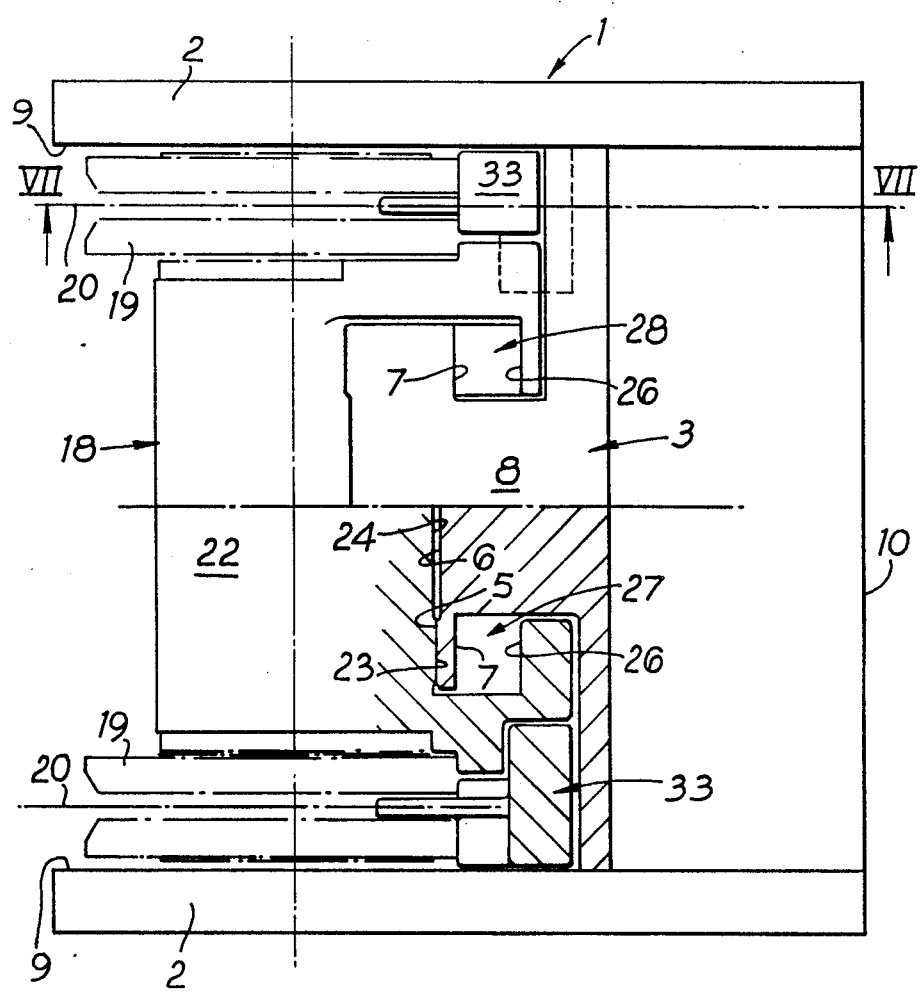
FIG. 6 is a diagrammatic plan view of the embodiment of FIG. 5.
Figure 7:
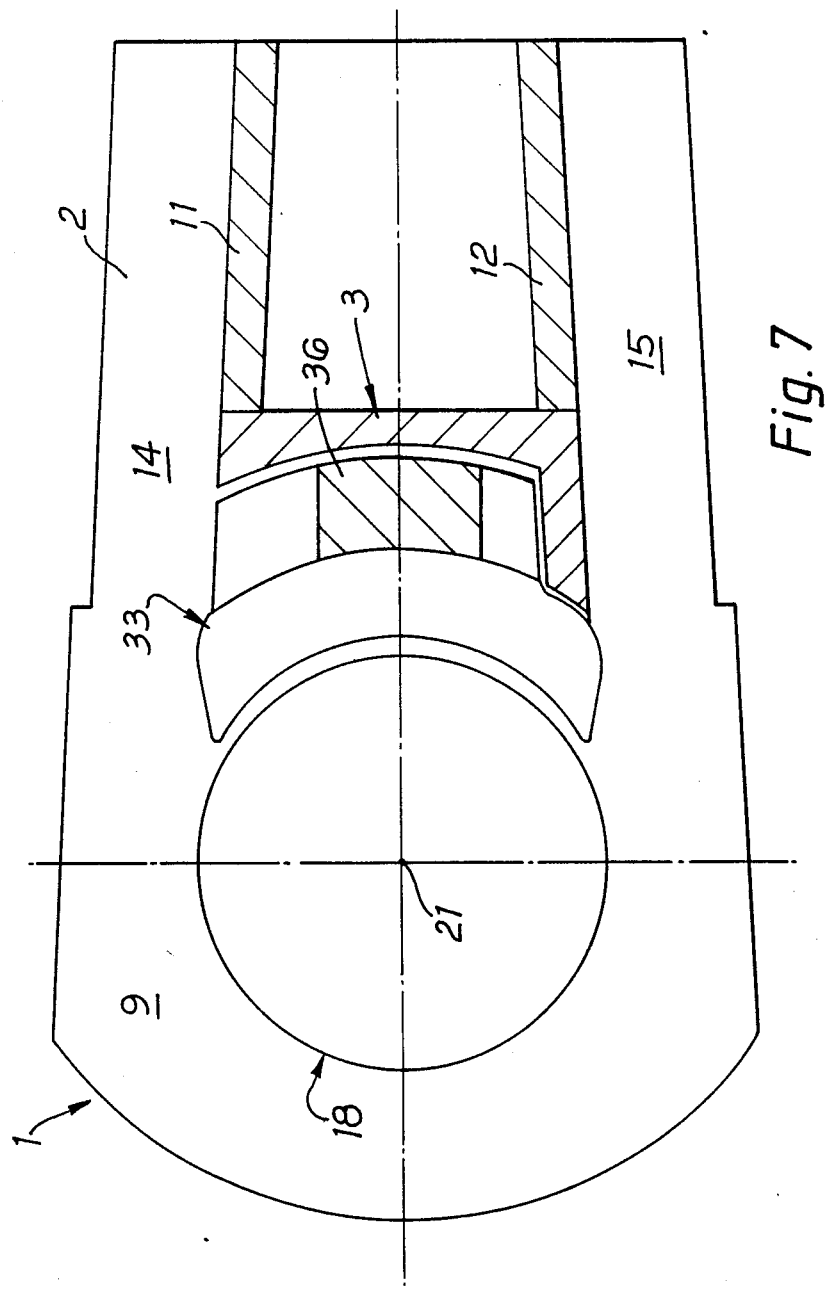
FIG. 7 is a section on the line VII—VII of FIG. 6.
Figure 8:
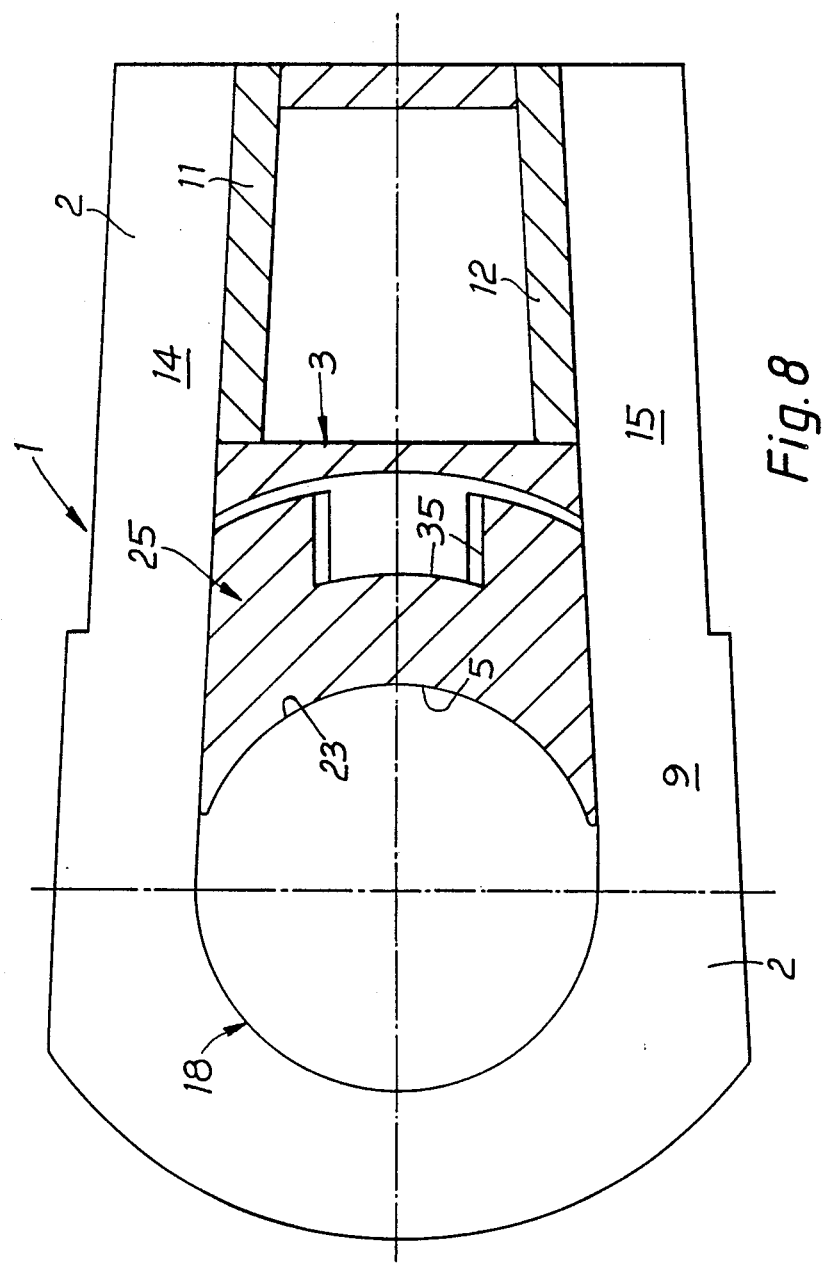
FIG. 8 is a section on the line VIII—VIII of FIG. 6.

In the embodiment of FIGS. 1 to 4, a drive frame 1, to define one end of a scraper chain conveyor, comprises a pair of spaced-apart, parallel sidewalls 2, interconnected by a cross-member 3 welded to both sidewalls 2, with the drive frame having a longitudinal axis 4. A second drive frame 1 would define the other end of the conveyor, and one or both drive frames would be driven in a generally conventional manner by means not shown. The cross-member 3 provides two convex seating surfaces 5 separated by a relieving recess 6 and two planar abutment surfaces 7 separated by a land 8. From the cross-member a deck plate extends to an end 10 of the drive frame 1, the deck plate comprising an upper plate 11 spaced from a lower plate 12, with both plates welded to the cross-member 3 and to a transverse member 13, the upper plate defining a portion of a conveying run 14, and the lower plate defining a portion of a return run 15 of the conveyor. As best seen in FIG. 2, the cross-member 3 is also provided at each lateral side with a lower recess 16, and with an upper rebate 17.

Between inside faces 9 of each sidewall 2 is located, with slight clearance, a sprocket barrel assembly 18 comprising a pair of spaced-apart sprocket rings 19, one aligned with each chain line 20 each adapted to engage drivably a round link chain, 20a of the conveyor by rotation about an axis 21 extending transversely of the sidewalls 2 and orthogonally to the longitudinal axis 4 of the drive frame 1. The sprocket rings 19 are mounted on a shaft 19a co-axial with the transverse axis 21 and supported in bearings 19b housed within a cast casing 22 extending between the sprocket rings 19 and providing outer peripheral portions defining seating surfaces 23 of concavity corresponding to the convexity of the seating surfaces 5, the surfaces 23 being separated by a relieving recess 24 and the surfaces 5 and 23 being in mutually engaging relationship when the sprocket barrel assembly 18 is clamped into the drive frame 1. For this purpose, the casing 22 is provided at each opposite end, and at a side adjacent the cross-member 3, with an integrally cast ear 25 each having a planar abutment surface 26 opposite to, and spaced from, one abutment surface 7 to define an upwardly open, receiving pocket 27 for a releasable fastener means 28 in the form of a cartridge that is readily insertable and retractable from above, and which, when inserted, locates the upper end of an operating nut 29 contiguously with the upper plate 11, the nut 29 serving, when rotated, to displace of a pair of wedges within the cartridge to expand or contract the cartridge, dependent upon the direction of rotation of the nut, to urge the seating surfaces 5, 23 into tight seating engagement thereby clamping the sprocket barrel assembly 18 into the drive frame 1, or to release the sprocket barrel assembly. Each ear 25 is also provided with a rebate 30 opposite each recess 16 of the cross-member 3, whereby upper and lower tongues 31, 32 respectively of a pair of chain stripper 33, one of which is associated with each sprocket ring 19, are located within a rebate 30 and recess 16 respectively, as best seen in FIG. 2, whereby each chain stripper is captivated in a "boltless" manner, and the ends 34 of each ear 25 seat in one upper rebate 17 of the cross-member 3, so that an upper surface 35 of each ear 25 is contiguous with the upper plate 11.

It follows that, to replace a worn chain stripper 33 of the embodiment of FIGS. 1 to 4, release and retraction, upwardly of the fastening means 28 enables the sprocket barrel assembly to be rotated anticlockwise about the axes 21, until the ears 25 clear the abutment surfaces 7, when the chain strippers can be manually retracted radially along an axis 34, as is progressively illustrated in chain-dotted line at 33A, 33B and 33C, with this procedure being revised to instal replacement chain strippers. Also when in the rotated position, the sprocket barrel assembly 18 can if required be withdrawn from the drive frame 1, e.g., for replacement, repair or maintenance, horizontally along the longitudinal axis 4.

Whilst the embodiment of FIGS. 1 to 4 provides a "handed" arrangement, a non-handed alternative is illustrated in the embodiment of FIGS. 5 to 8, where each ear 25 is provided with a laterally accessible female recess 35 to receive a laterally extending male projection 36 provided on each chain stripper 33. Thus, after release of the fastening means 28 and rotation to axis 34 as described with the first embodiment, worn chain strippers 33 of the second embodiment may be withdrawn laterally, with this procedure reversed to instal replacement chain strippers.

Figure 9:
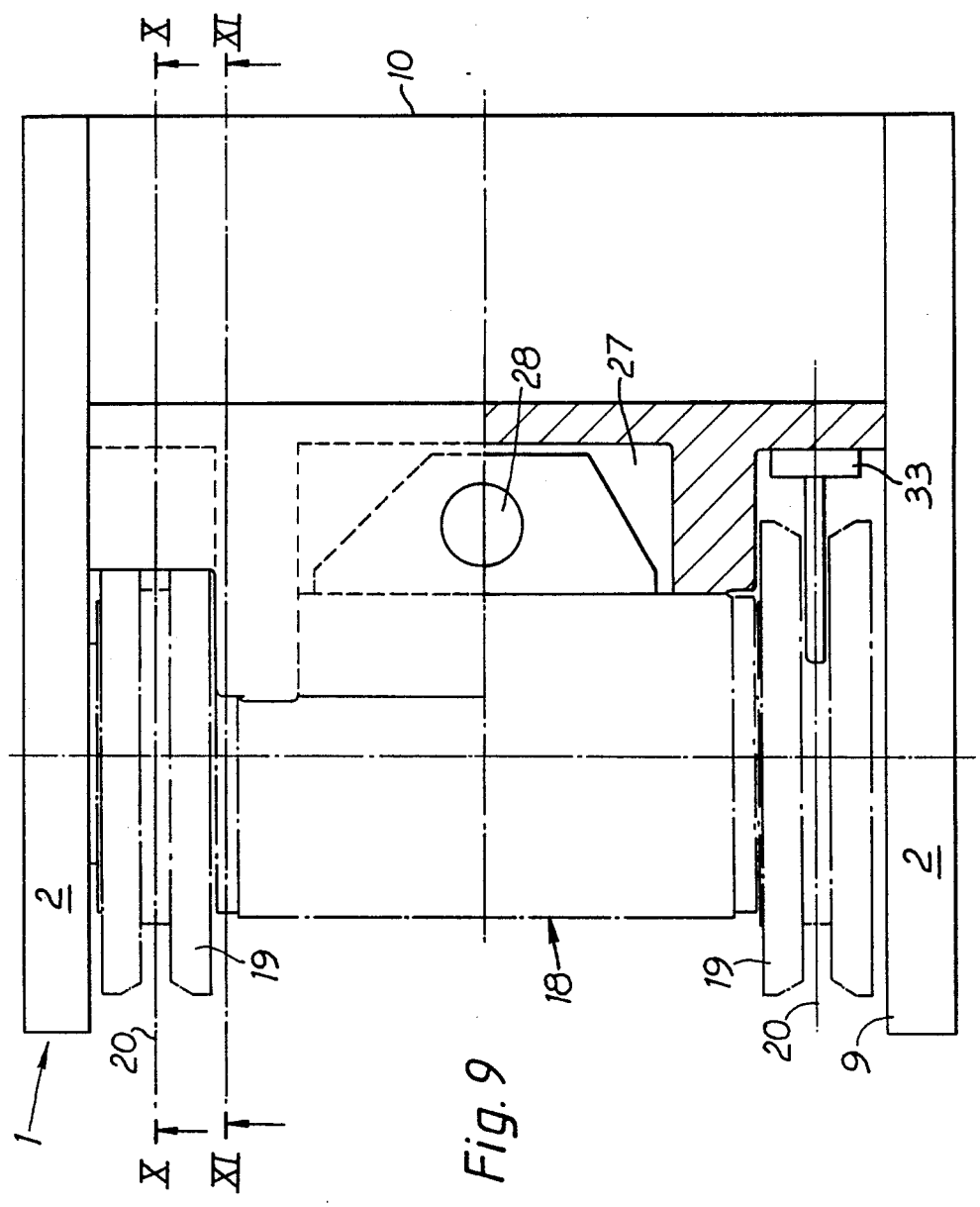
FIG. 9 is a diagrammatic plan view of a third embodiment of the drive frame in accordance with the invention.
Figure 10:
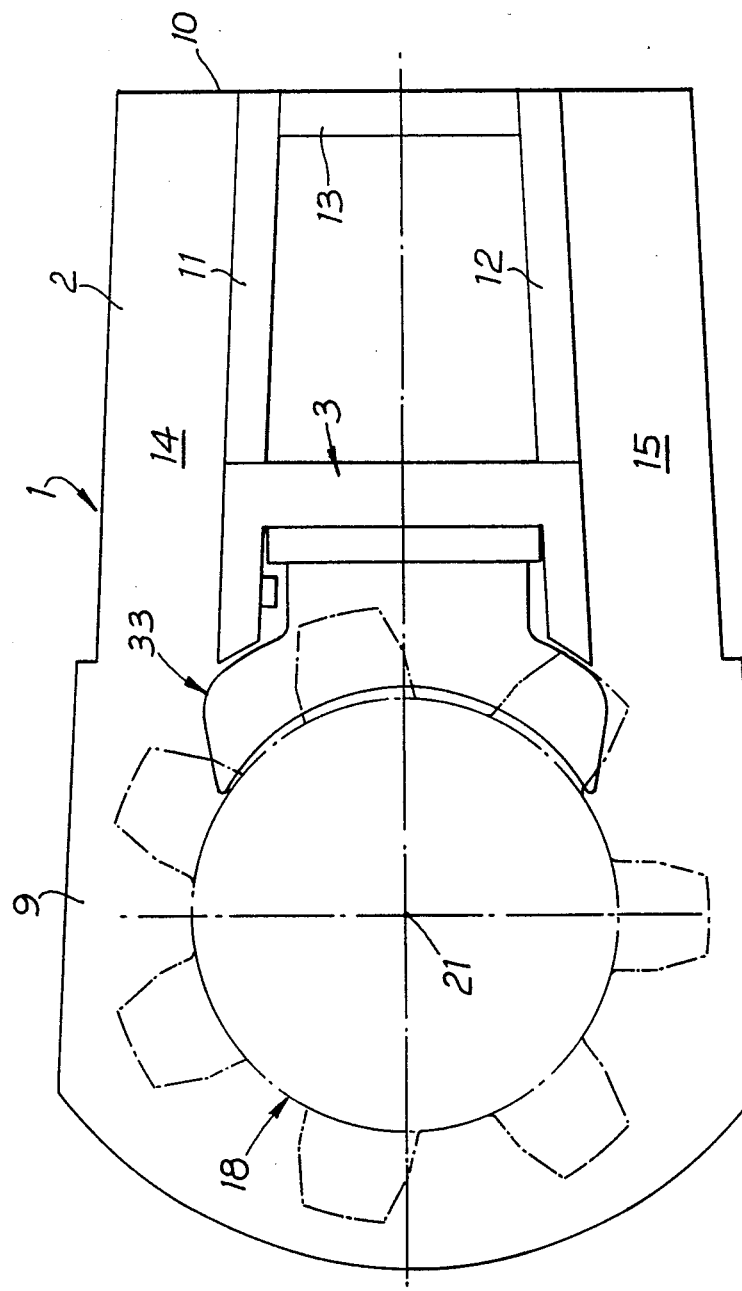
FIG. 10 is a section on the line X—X of FIG. 9.
Figure 11:
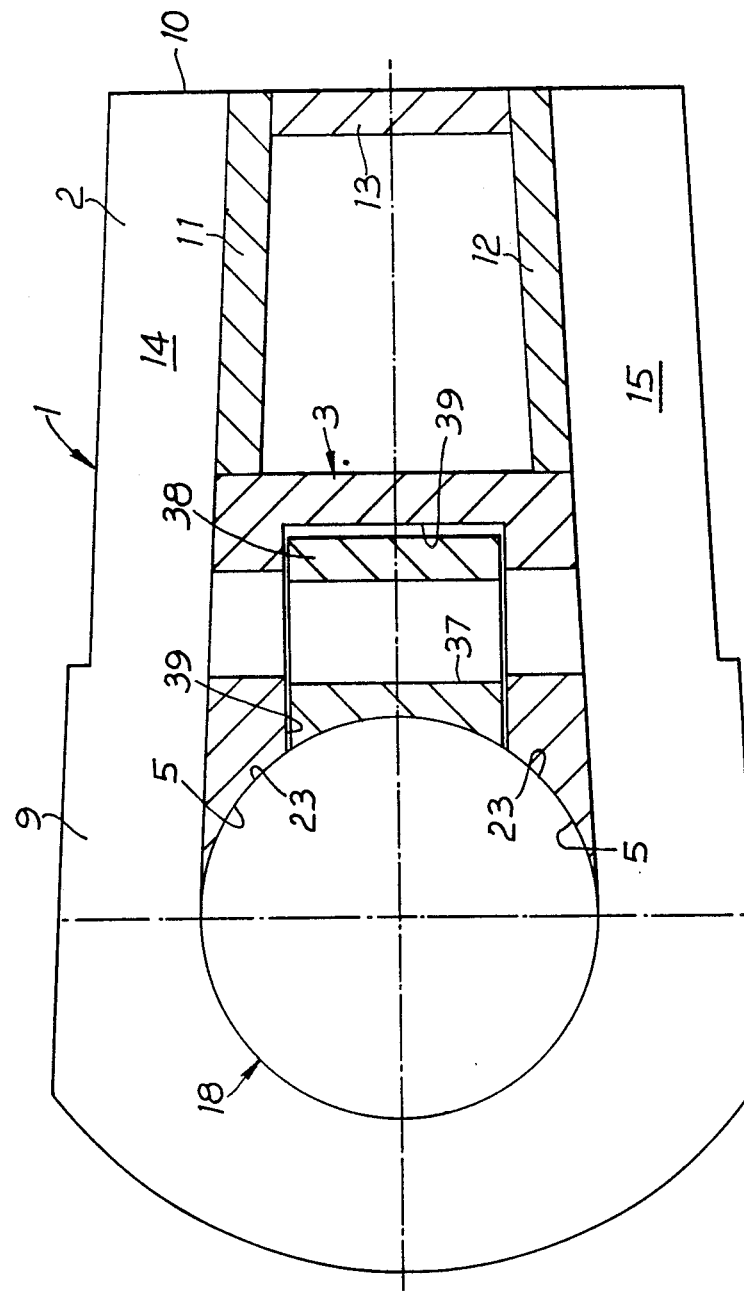
FIG. 11 is a section on the line XI—XI of FIG. 9.

In the embodiments of FIGS. 1 to 4 and FIGS. 5 to 8, two spaced apart fastener/expansion means 28 have been provided, and the embodiments of FIGS. 9 to 11 illustrates an alternative, simplified construction of drive frame, with a single, centrally-located expansion means 28 which passes through an aperture 37 in a nose 38 cast integrally with the casing 22 and projecting into a receiving recess 39 in the cross-member 3 whereby, upon expansion of the fastener means 28, the surfaces 5 and 23 are brought into tight seating engagement. Upon release and upward withdrawal of the fastener means 28, the sprocket barrel assembly 18 is not rotated as with the first two embodiments, but is retracted horizontally, this also serving to expose the chain strippers for replacement if required.

What we claim is:

1. A drive frame for a scrapper chain conveyor comprising a pair of spaced-apart parallel sidewalls, a cross-member interconnecting said sidewalls by being welded thereto; a sprocket barrel assembly, at least one sprocket ring provided on said sprocket barrel assembly, at least one endless chain assembly of said conveyor being adapted to engage said at least one sprocket ring; at least one seating surface provided on said sprocket barrel assembly, at least one seating surface provided on the cross-member, said at least one sprocket barrel assembly seating surface and said at least one cross-member seating surface being mutually engageable; at least one abutment face provided on said cross-member; at least one abutment face provided on said sprocket barrel assembly in close but spaced proximity from said cross-member abutment face to define at least one upwardly open pocket; and a releasable fastening means for securing said sprocket barrel assembly to said drive frame via said mutually engageable seating surfaces, that is lowerable into, and raisable from, said at least one pocket, and that is also actuable and accessible from above whereby, after the lowering of said fastening means from above, actuation of said fastening means from above in a first direction, causes said at least one seating surface of said sprocket barrel assembly to be urged into tight seating engagement with said at least one seating surface of said cross-member and hence with said drive frame, and upon actuation of said fastening means again from above, in an opposite direction, causes said sprocket barrel assembly to be released from tight seating engagement with said cross-member and hence with said drive frame, whereupon said fastening means can be lifted from said at least one pocket to provide for access, disassembly and serving.

2. A drive frame as claimed in claim 1, wherein said sprocket barrel assembly has a transverse axis and, after release and removal of said fastening means, said sprocket barrel assembly is rotatable about said transverse axis for access, disassembly and servicing of components of said drive frame.

3. A drive frame as claimed in claim 1, wherein after release and removal of said fastening means, said sprocket barrel assembly is retractable from one end of said drive frame in a linear direction for access, disassembly and servicing of components of said drive frame.

4. A drive frame as claimed in claim 1, wherein said seating surfaces are arcuate, with said at least one seating surface of said sprocket barrel assembly being arcuately convex, and said at least one seating surface of said cross-member being arcuately concave.

5. A drive frame as claimed in claim 4, wherein a cylindrical outer casing is provided for said sprocket barrel assembly, and said at least one seating surface of said sprocket barrel assembly is provided by an outer peripheral portion of said cylindrical outer casing.

6. A drive frame as claimed in claim 1 wherein internal bearings are provided in said sprocket barrel assembly being located inboard of said sidwalls of said drive frame.

7. A drive frame as claimed in claim 1, wherein a shaft forms part of said sprocket barrel assembly, and bearings rotatably support said shaft for rotation about said axis, said shaft being provided with said at least one chain-engaging sprocket ring.

8. A drive frame as claimed in claim 2, provided with at least one chain stripper for said at least one sprocket ring which said stripper is exposed for ready replacement upon upward rotation of said sprocket barrel assembly.

9. A drive frame as claimed in claim 3, provided with at least one chain stripper for said at least one sprocket ring, which said stripper is exposed for ready replacement upon retraction of said sprocket barrel assembly.

10. A drive frame as claimed in claim 1, having a longitudinal centre line, wherein two abutment faces are provided on said cross-member, one of said two abutments faces being located to each opposite side of said longitudinal centre line, with two corrsponding abutment faces provided on said sprocket barrel assembly, and with a fastening means insertable between each adjacent pair of said abutment faces.

11. A drive frame as claimed in claim 10, wherein an expansion means constitutes said fastening means.

12. A drive frame as claimed in claim 11, wherein two associated wedge members and a displacement screw form part of said expansion means which takes the form of a cartridge.

13. A drive frame as claimed in claim 12, wherein an upper end of said displacement screw terminates in an hexagonal nut for engagement by a suitable spanner or socket.

14. A drive frame a claimed in claim 13, provided with a deck plate extending between said sidewalls, an upper surface being provided on said deck plate, and said upper end of said nut being contiguous with said upper surface of said deck plate.

15. A drive frame as claimed in claim 1, wherein a single, centrally-located expansion means is provided.

16. A drive frame as claimed in claim 1, wherein said expansion means comprises two spaced-apart expansion means.

17. A drive frame as claimed in claim 1 of the twin outboard type, comprising two chain strippers, one located at each lateral side of said drive frame and retained in a "boltless" manner.

18. A drive frame as claimed in claim 17, wherein mutually engageable male/female abutments of said strippers and said cross-member are provided, and a stripper-engaging trapping means is also provided.

19. A drive frame as claimed in claim 18, wherein a recess to receive a lower portion of a chain stripper, is provided at each lateral side of said cross-member, with an upper portion of said chain stripper adapted to be engaged by said trapping means, whereby said chain stripper is captivated in position without the use of screws, bolts etc., when said sprocket barrel assembly is in an operative position.

20. A drive frame as claimed in claim 19, wherein a rebate is provided in said cross-member, whereby tongues of said sprocket barrel assembly are seatable in said rebate to form a contiguous surface.

21. A drive frame as claimed in claim 17, wherein an extension, having a female recess to receive a male projection of an adjacent chain stripper, is provided at each lateral side of said sprocket barrel assembly, a portion of said cross-member closing said recess, and hence trapping said chain strippers, when said sprocket barrel assembly is in its operative position.

22. A drive frame as claimed in claim 21, wherein said recesses are laterally open, so that said chain-strippers are insertable and retractable in a lateral direction.

23. A drive frame as claimed in claim 14, wherein said deck plate is of a non-detachable kind, welded permanently in position.

24. A drive frame as claimed in claim 23, wherein said deck plate comprises two plates spaced-apart vertically, being an upper plate to define, in use, a portion of a conveying run of a conveyor, and a lower plate to define a portion of a return run of a conveyor.

25. A drive frame as claimed in claim 24, wherein ends of said upper and lower plates adjacent said sprocket barrel assembly are both welded to said cross-member.

26. A drive frame as claimed in claim 5, wherein said outer casing of said sprocket barrel assembly, its at least one seating surface, its at least one abutment surface and any trapping portions, are formed integrally as a casting.

27. A drive frame as claimed in claim 1, wherein said cross-member is a casting.

28. A drive frame as claimed in claim 1, wherein said cross-member is a fabrication.

* * * * *